US011799400B2

(12) United States Patent
Buck

(10) Patent No.: US 11,799,400 B2
(45) Date of Patent: Oct. 24, 2023

(54) COMPRESSED INVERTED MAGNETIC ENERGY SOURCE

(71) Applicant: Buck Maynard Houston LLC, Sheridan, WY (US)

(72) Inventor: Daniel C. Buck, Chicago, IL (US)

(73) Assignee: Buck Maynard Houston LLC, Sheridan, WY (US)

( * ) Notice: Subject to any disclaimer, the term of this patent is extended or adjusted under 35 U.S.C. 154(b) by 0 days.

(21) Appl. No.: 17/575,302

(22) Filed: Jan. 13, 2022

(65) Prior Publication Data
US 2022/0231621 A1    Jul. 21, 2022

Related U.S. Application Data

(60) Provisional application No. 63/153,480, filed on Feb. 25, 2021, provisional application No. 63/138,688, filed on Jan. 18, 2021.

(51) Int. Cl.
| | |
|---|---|
| *H02K 49/10* | (2006.01) |
| *H02N 11/00* | (2006.01) |
| *H02K 5/15* | (2006.01) |
| *H02K 7/116* | (2006.01) |
| *H02K 7/00* | (2006.01) |
| *H02K 7/02* | (2006.01) |
| *H02K 5/173* | (2006.01) |

(52) U.S. Cl.
CPC ............ *H02N 11/008* (2013.01); *H02K 5/15* (2013.01); *H02K 5/1735* (2013.01); *H02K 7/003* (2013.01); *H02K 7/02* (2013.01); *H02K 7/116* (2013.01)

(58) Field of Classification Search
CPC ...... H02K 7/116; H02K 49/10; H02K 49/102; H02K 49/104; H02K 49/106; H02K 49/108
See application file for complete search history.

(56) References Cited

U.S. PATENT DOCUMENTS 3,221,172 A * 11/1965 Rolison .................... H02J 9/08
                                                                322/9
3,523,204 A *  8/1970 Rand ...................... H02K 49/06
                                                                310/94
3,806,733 A     4/1974 Haanen
4,229,661 A    10/1980 Mead et al.
(Continued)

FOREIGN PATENT DOCUMENTS

| CN | 201185369 Y | 1/2009 |
| JP | 2019115236 A | 7/2019 |
| WO | 2012173757 | 12/2012 |

OTHER PUBLICATIONS

PCT/US2022/012669, International Search Report and Written Opinion, dated Apr. 28, 2022, 17 pages.

*Primary Examiner* — Dang D Le
(74) *Attorney, Agent, or Firm* — Andrus Intellectual Property Law, LLP

(57) ABSTRACT

An example of a system for the generation of rotational force includes a stator which may include an interior surface and a plurality of stator magnets. A rotor may include an exterior surface and a plurality of rotor magnets. A shaft may be connected to the rotor. A compressive force is applied to the rotor to move the rotor to a position relative to the stator such that the plurality of stator magnets and the plurality of rotor magnets repulse to create a rotational force on the rotor.

19 Claims, 6 Drawing Sheets

(56) References Cited

U.S. PATENT DOCUMENTS

| | | | |
|---|---|---|---|
| 4,447,738 A | 5/1984 | Allison | |
| 4,751,486 A * | 6/1988 | Minato | H02K 29/10 310/156.01 |
| 6,262,508 B1 | 7/2001 | Shibayama et al. | |
| 6,836,042 B2 * | 12/2004 | Kuipers | F16C 39/063 310/90.5 |
| 8,336,409 B2 * | 12/2012 | Edwards | H02K 53/00 74/25 |

\* cited by examiner

COMPRESSED INVERTED MAGNETIC ENERGY SOURCE

CROSS-REFERENCE TO RELATED APPLICATIONS

The present application claims priority of U.S. Provisional Patent Application No. 63/138,688, filed on Jan. 18, 2021 and claims priority of U.S. Provisional Patent Application No. 63/153,480, filed on Feb. 25, 2021. The contents of both of these applications are hereby incorporated by reference in their entireties.

BACKGROUND

Magnets have two poles where magnetic fields emanate from and where the magnetic field is most intense. These poles are designated "north" and "south." Two magnets with facing opposed "north" and "south" poles will attract. Two magnets with facing similar "north" and "north" poles will repel. Compression magnetism utilizes the repelling forces of two like magnetic poles to translate between forms of energy when the magnets are held in a compressed state.

Newton's first law of motion is the law of inertia, which states that an object at rest tends to stay at rest and an object in motion tends to stay in motion without acceleration unless acted on by a non-zero net force. A non-zero net force exists in any system wherein the combination of forces acting within the system do not cancel each other out.

Newton's second law of motion states that the net force acting on an object is equal to the product of the object's mass and acceleration, in both direction and magnitude, or $F_{net}=m*a$. Fine-tuning the compression and adjustment to the angle of opposing magnets will determine the direction and magnitude of the "force."

Newton's third law of motion states that for every action force there is a reaction force that is equal in magnitude and opposite in direction. The compressed inverted magnets create the action force that produces a reaction force. which propels the spinning rotor of the motor.

Rotational motion follows Newton's laws of motion as well, but can better be understood using the rotational analogs to linear motion. In rotational motion, torque is often used to better describe the force acting upon an object. Torque is the cross product of radius and force, and thus more specifically captures the effect of a force on a system in rotational motion. Furthermore, force can be defined as the change in momentum of an object over time, in addition to the product of an object's mass and acceleration. Rather than describing an object in terms of its acceleration, it is more common to describe an object in rotational motion using its angular momentum. Angular momentum is the product of an objects mass, velocity, and the radius of the circle it is traversing. The first law of rotational motion states that an object will move with constant rotational velocity unless acted upon by a non-zero net torque. The second law of rotational motion states that the net torque acting on an object in rotational object is equal to the cross product of the radius of the circle being traversed and the product of the object's mass and acceleration (force). The third law of motion remains the same as for linear motion, although it is important to note that rotational acceleration is defined as the rotational velocity squared divided by the radius of the circle being traversed. Furthermore, the direction of centripetal acceleration points inwards to the point which is being rotated about.

BRIEF DISCLOSURE

In one embodiment, a compressed inverted magnetic energy system for the generation of rotational force comprises a stator comprising an interior surface and a rotor comprising an exterior surface and a shaft connected to the rotor. The system further comprises a plurality of stator magnets arranged in the interior surface of the stator, each stator magnet of the plurality of stator magnets having a first pole and a second pole, and each stator magnet of the plurality of stator magnets being arranged with the first pole pointing to the stator as well as a plurality of rotor magnets arranged in the exterior surface of the rotor, each rotor magnet of the plurality of rotor magnets having the first pole and the second pole, and each rotor magnet of the plurality of rotor magnets being arranged with the first pole pointing exterior to the rotor. In said embodiment, a compressive force is applied to the rotor to move the rotor to a position relative to the stator such that the plurality of stator magnets and the plurality of rotor magnets repulse to create a rotational force on the rotor.

An example of a system for the generation of rotational force includes a stator which may include an interior surface. A plurality of stator magnets are arranged in the interior surface, each stator magnet of the plurality of stator magnets having a first pole and a second pole, and each stator magnet of the plurality of stator magnets being arranged with the first pole pointing interior to the stator. A rotor may include an exterior surface. A plurality of rotor magnets may be arranged in the exterior surface, each rotor magnet of the plurality of the rotor magnets having the first pole and the second pole, and each rotor magnet of the plurality of rotor magnets being arranged with the first pole pointing exterior to the rotor. A shaft may be connected to the rotor. A compressive force is applied to the rotor to move the rotor to a position relative to the stator such that the plurality of stator magnets and the plurality of rotor magnets repulse to create a rotational force on the rotor.

Implementations may include one or more of the following features. The system where the stator magnets and the rotor magnets are further aligned tangentially to a circumference about a common axis of the rotor and the stator. The stator magnets are angled perpendicular to the stator surface and the rotor magnets are angled perpendicular to the rotor surface. The stator and rotor magnets are optionally angled tangentially to a circumference about a common axis of the rotor or angled such that the rotor magnets are perpendicular to the rotor surface and the stator magnets are perpendicular to the stator surface. The compressive force is applied to the compression plate, which applies the compressive force to the rotor. The shaft extends through a hole in the compression plate. The system may include: a rotor flange that extends away from the rotor and extends about the shaft, the rotor flange is configured to engage the compression plate to transfer the compressive force from the compression plate to the rotor. The ball bearings reduce the friction between the compression plate and the rotor flange. The system may include a flywheel secured to the shaft. The flywheel may include weights secured to the flywheel. The flywheel has a mass distributed radially away from the shaft. The system may include: a battery charger electrically connected to the electricity generator. The compressive force is applied to the compression plate, which applies the compressive force to the rotor in a direction along the common axis; and where the first pole of the vertex magnet repulses the first pole of the tip magnet. Repulsion of the tip magnet from the vertex magnet reduces friction between the rotor and compression plate. The system may include: a gear reduction connected to the shaft; and an electricity generator connected to the gear reduction. The tip magnet and the vertex magnet are arranged axially with a common axis of the rotor and of the stator with the first pole of the tip magnet facing the first pole of the vertex magnet.

An example of a system for the generation of rotational force includes a stator may include an interior surface. A plurality of stator magnets are integrated within the stator. Each stator magnet of the plurality of stator magnets may include a first pole and a second pole. Each stator magnet of the plurality of stator magnets may be arranged with the first pole facing inward from the interior surface. A rotor may include an exterior surface. A plurality of rotor magnets are integrated within the rotor. Each rotor magnet of the plurality of the rotor magnets includes a first pole and a second pole. Each rotor magnet of the plurality of rotor magnets may be arranged with the first pole facing outward from the exterior surface. The system also includes where the first pole of the stator magnets and the first pole of the rotor magnets are the same pole. A shaft is connected to the rotor. A compressive force between the stator and the rotor reduces a distance between the rotor and the stator such that the plurality of stator magnets and the plurality of rotor magnets repulse to create a rotational force on the rotor.

DETAILED DISCLOSURE

Disclosed herein is a compressed inverted magnetic energy source (CIMES) system 100. The CIMES system 100 includes a rotor and stator system integrated with magnetic components. The magnetic system is held in a compressed state in order to produce a net magnetic force which is directed to rotate a rotor. For the purposes of this disclosure, the system extends from top to bottom in an axial direction. The system rotates about a common axis in the azimuthal direction Φ. Components of the system are arranged at various distances about the common axis in the radial direction. Finally, components of the system are arranged at various angles with respect to the common axis in the zenith direction θ.

Figure 3:
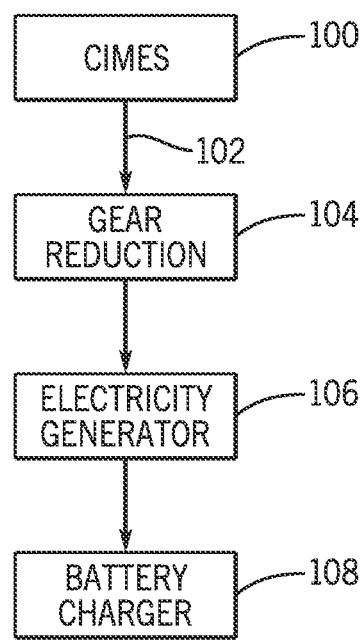
FIG. 3 is a system diagram showing a use of the compressed inverted magnetic energy source.

CIMES system 100 uses magnetic energy between two components held in compression. In a non-limiting example shown in FIG. 3, the magnetic energy is directed to send an internal moving part or rotor that is pushed by magnets to pull a flywheel to turn an external shaft 102 which uses gear reduction 104 to create the necessary torque to power, for example, a generator 106 to create electricity, which is provided for example, a battery charger 108 to charge a battery. A person of ordinary skill in the art will, however, recognize many other arrangements and uses of the system 100 as described herein.

Figure 1:
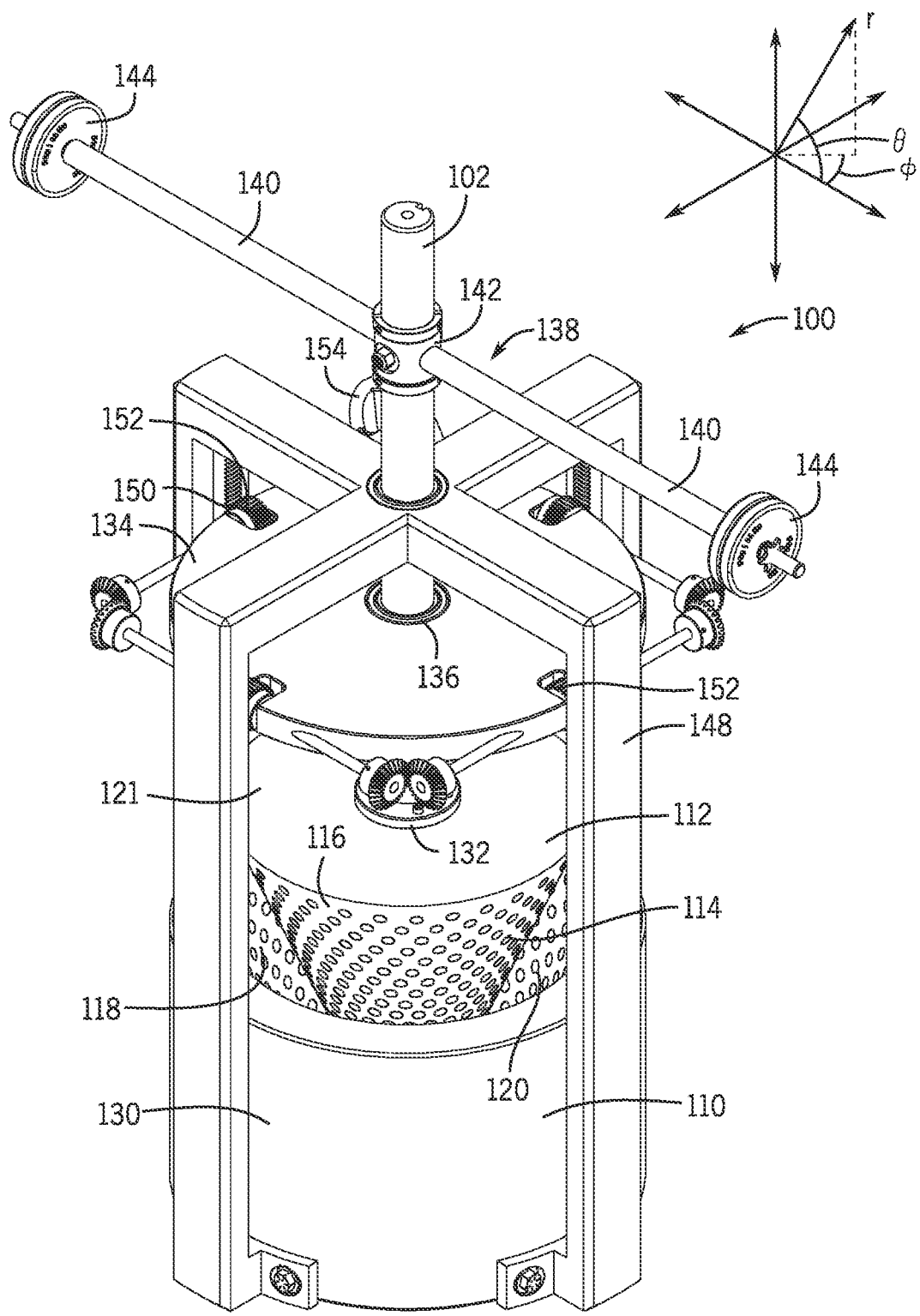
FIG. 1 is a perspective view of a compressed inverted magnetic energy source.
Figure 2:
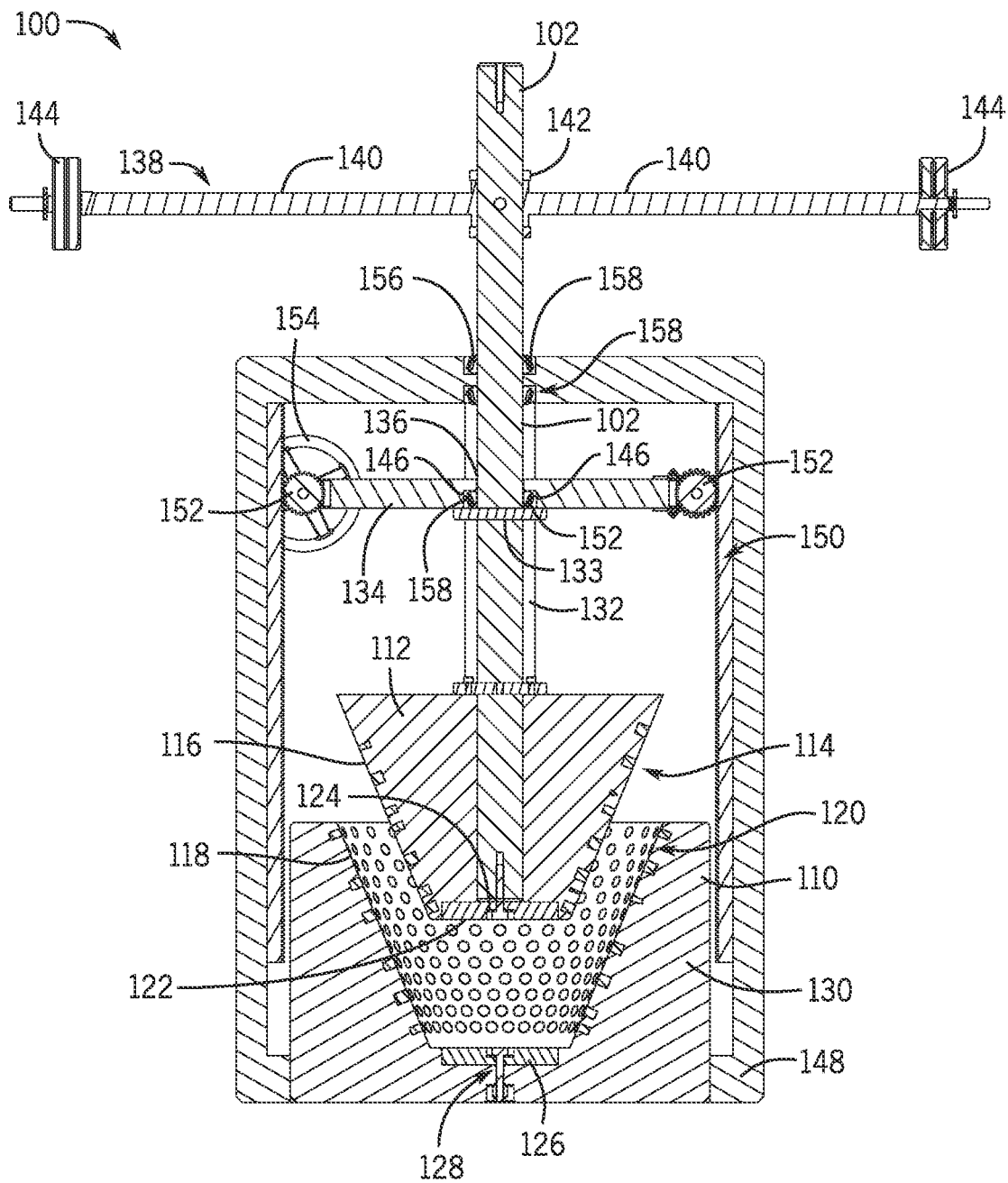
FIG. 2 is a sectional view of the compressed inverted magnetic energy source.

Referring to FIGS. 1 and 2, there are two main components to the system: a fixed stator 110 and a moving rotor 112. The rotor 112 exemplarily is a frustum of a cone, and the stator 110 is exemplarily shaped like a funnel, such that the rotor 112 is generally complementary to the stator 110. The rotor 112 may be constructed of a solid block of aluminum. In another example, the rotor 112 may be constructed of plastic or another magnetically inert material. The rotor 112 is configured to be positioned within the stator 110 and to spin within the stator 110. The rotor comprises an outer surface 116 surrounding the rotor 112 in the azimuthal direction 1. As described in further detail herein, the rotor 112 includes rotor magnets 114 integrated within the rotor 112 and having the same pole (e.g., "north") facing radially outward from the outer surface 116.

The stator 110 is shaped like a funnel or bowl extending into a main body 130 of the stator 110. The stator 110 may be constructed of a solid block of aluminum. In another example, the body 130 of the stator 110 may be constructed of plastic or another magnetically inert material. An interior surface 118 of the stator 110 extends in the azimuthal direction Φ and faces radially inward toward the outer surface 116 of the rotor 112. The stator 110 is also integrated with a series of stator magnets 120 arranged so that the same pole (e.g., "north") faces radially inward from the interior surface 118. The pole that faces radially outward from the outer surface 116 of the rotor 112 is the same pole chosen to face radially inward from the interior surface 118 of the stator 110. The stator 110 is configured to be stationary within the system, while the rotor 112 is able to accelerate rotationally. Thus, when the stator 110 and rotor 112 interact with one another magnetically to produce an action force, the reaction force cannot produce acceleration within the stator 110, and therefore produced an acceleration in the rotor 112. This is in accordance with Newton's second and third laws of motion as discussed previously. In operation, the stator magnets 120 repel the rotor magnets 114 to push, and thus spin, the rotor 112 relative to the stator 110.

A frustum of a cone comprises two faces, a first face having a first diameter, and a second face having a second diameter which is less than the first diameter. The rotor 112 extends in an axial direction with an outer surface 121 with a first diameter and a tip 122 with a second diameter. The first diameter is larger than the second diameter. The tip 122 includes a tip magnet 124. The vertex 126 at the center of the stator 110 includes a vertex magnet 128. The tip magnet 124 is arranged axially above the vertex magnet 128 such that faces of both the tip magnet 124 and the vertex magnet 128 are arranged with the same pole (e.g. "north") facing directly at each other. The repulsive force generated by the compression of the tip magnet 124 and the vertex magnet 128 lessens friction within the system by producing an upwards force in the axial direction which opposes the axially downward force of gravity.

Figure 4:
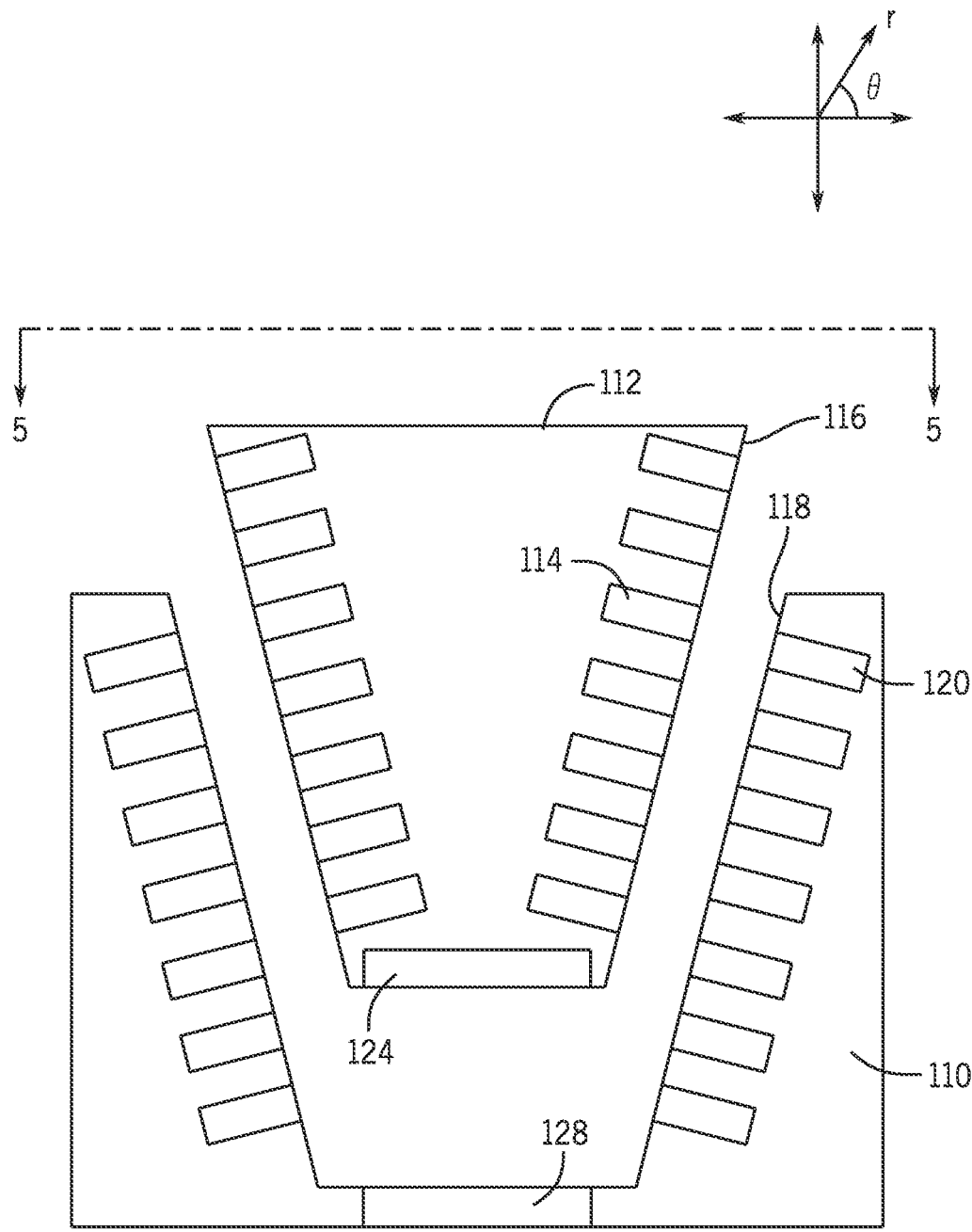
FIG. 4 is a sectional view of the compressed inverted magnetic energy source.

As noted above, stator magnets 120 are arranged within the stator 110 such that the same poles (e.g., "north") face radially inwards from the interior surface 118 towards a central axis of the stator 110. As shown in FIG. 4, the stator magnets 120 are all set at an angle with respect to the central axis of the stator 110. The angle of the stator magnets 120 may be oriented with respect to a slope of the interior surface 118 of the stator 110. The stator magnets 120, for example by being perpendicular to the interior surface, extend radially outwards away from the central axis and are angled downwards in the zenith direction θ or otherwise against the direction from which the rotor 112 is introduced to the stator 110. Similarly, the rotor magnets 114 are arranged such that the same pole faces radially outward from the outer surface 116 of the rotor 112. The rotor magnets 114 are also all set at an angle. This angle may be relative to the slope of the outer surface 116 and may be angled relative to the central axis of the stator/rotor as well. The rotor magnets 114 extend radially outwards from the central axis and are also angled downward in the zenith direction θ from the central axis or otherwise in the direction in which the rotor 112 is introduced to the stator 110.

Figure 5:
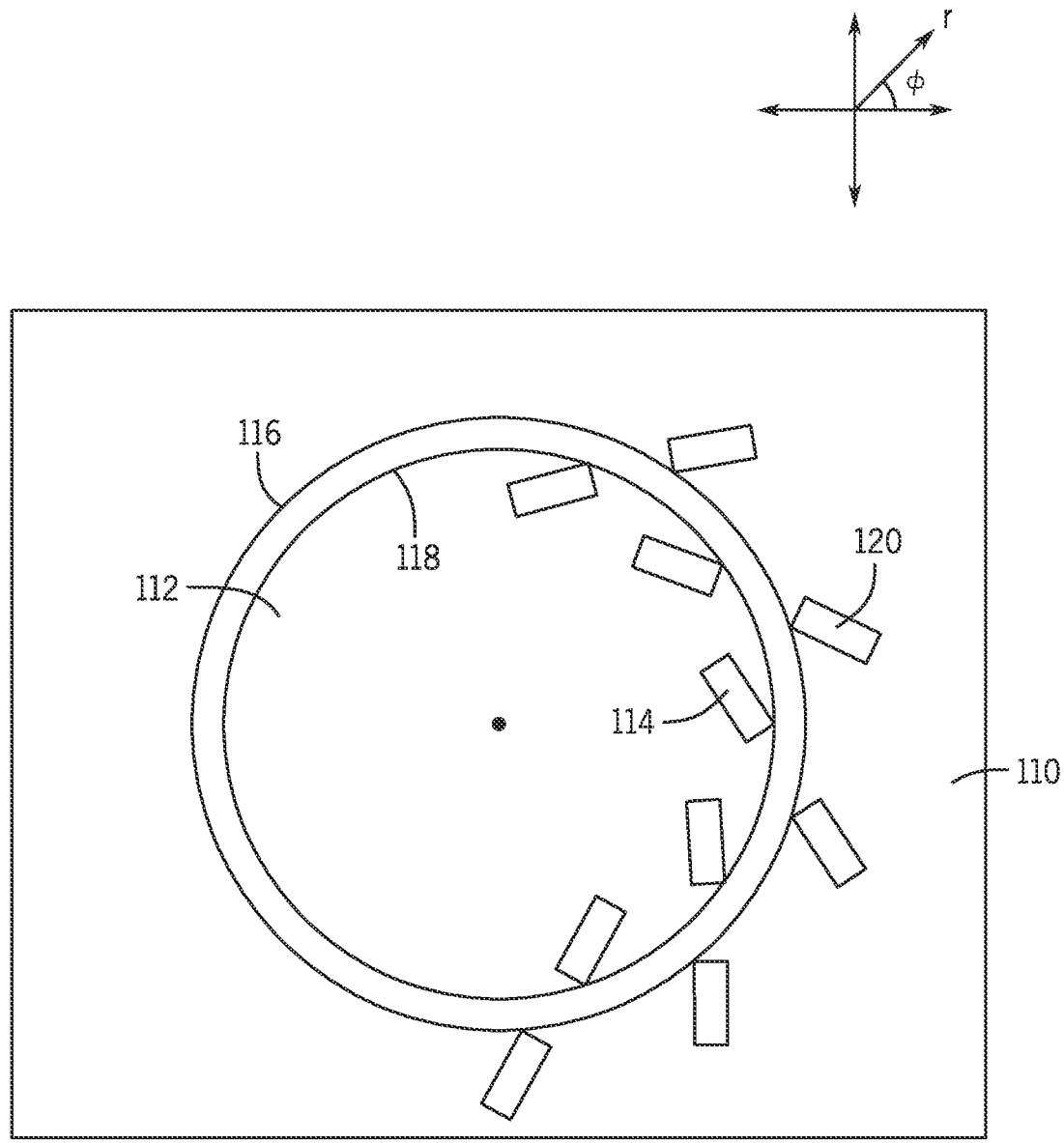
FIG. 5 is a sectional view of the compressed inverted magnetic energy source depicted in FIG. 4.

In an example, the central axes of the stator magnets 120 and the rotor magnets 114 are arranged around a circumference about the central axis of the stator 110 and rotor 112. FIG. 5 depicts an example, wherein the common poles (e.g. north poles) of the stator magnets 120 and the rotor magnets 114 are angled about the central axis in the azimuthal direction 1 such that the repulsive force of the stator magnets 120 against the rotor magnets 114 is directed to impart a force on the rotor 112 to rotate the rotor 112 in a direction (e.g. counter-clockwise).

The stator magnets 120 are angled to repel the rotor magnets 114, the opposition of the rotor magnets 114 and the stator magnets 120 also opposes compression of the rotor 112 towards the stator 110 along the central axis. Magnetic intensity decreases according to the inverse square law, meaning that as a distance between magnets increases, an intensity of the magnetic field between them decreases exponentially. Therefore, when the rotor 112 is compressed towards the stator 110 as described in further detail herein, and the distance between the rotor magnets 114 and stator magnets 120 is reduced, the intensity of the magnetic field increases, and a greater repulsive force is produced to rotate the rotor 112. Looking down the central axis of the stator/rotor in FIG. 5, the stator magnets 120 are pushing the rotor 112 counter-clockwise in the azimuthal direction Φ. However, it will be recognized that the system may be arranged to push the rotor 112 clockwise in the azimuthal direction Φ.

The stator 110 is in a fixed position while the rotor 112 rotates under the repulsive force generated between the rotor magnets 114 and the stator magnets 120. A shaft 102 extends axially upward from the rotor 112. The shaft 102 is oriented along the central axis of the stator 110 and the rotor 112. Rotation of the rotor 112 as described above results in rotation of the shaft 102 in the same direction. The shaft 102 is connected to a compression plate 134 as will be described in further detail herein. The compression plate 134 includes a hole 136 through which the shaft 102 extends.

An external flywheel 138 is attached to the shaft 102. As depicted, the flywheel 138 includes two opposed bars 140 secured to the shaft 102 with a shaft collar 142. Unitary or removable weights 144 are secured to the ends of the opposed bars 140. As described previously, angular momentum is the product of an object's mass, velocity, and the radius of the circle it is traversing. By providing mass at a radial distance away from the shaft 102, the flywheel 138 increases the momentum generated by the shaft/rotor system as it is rotated by the magnets 114, 120. While the flywheel 138 is depicted in an exemplary "dumbbell" shape, it will be recognized that the same or a similar profile of the flywheel 138 may be extended 360 degrees about the shaft 102 to form a plate or disk shape. This plate or disk-shaped flywheel may be circular in its perimeter. The flywheel 138 adds mass to the shaft, and the inertia of the shaft continues rotation of the shaft in the periods between when the rotor magnets 114 and the stator magnets 120 are in repulsive alignment. In certain examples, a separate motor (not depicted) provides an initial input of rotational motion to the rotor 112. Once the rotor 112 is initially rotating, the inertia from the rotor 112 and flywheel 138 system keeps the rotor 112 rotating when the magnets 114, 120 fall out of repulsive alignment with one another as will be discussed in further detail herein.

The flywheel 138 includes mass at its outer radius to increase the angular momentum of the system. The flywheel 138 may be constructed of a magnetically inert material that does not interfere with the magnetic field of the rotor 112. The flywheel 138 may exemplarily be constructed of aluminum. The compression of the rotor 112 and the stator 110 controls the amount of energy generated by the system and the flywheel contributes to the momentum and thus inertia to keep the motor from locking up, as well as creating torque for gear reduction to the generator.

As the rotor 112 turns in the azimuthal direction Φ, the stator magnets 120 and the rotor magnets 114 move in and out of the alignment which causes the rotor 112 to rotate in the desired direction of rotation. As each rotor magnet 114 comes into alignment with a stator magnet 120, it is subsequently repulsed in the direction of rotation of the rotor 12 and falls into alignment with the adjacent stator magnet 120. During this transition between alignment with adjacent stator magnets 120, each rotor magnet 114 is momentarily repulsed in an azimuthal direction Φ opposite the direction of rotation of the rotor 112. While the added inertia of the flywheel 138 operates as described above to overcome this, the system is further designed to limit this magnetic resistance. The rotor magnets 114 and the stator magnets 120 are distributed along the azimuthal direction 1 about the central axis of the rotor 112 and the stator 110 at irregularly spaced intervals. If all the rotor magnets 114 and the stator magnets 120 were aligned in perfect rows and spacing, all of the pairs of rotor magnets 114 and stator magnets 120 continuously are aligned in the same way. Thus when all pairs of magnets 114, 120 are misaligned, the magnetic repulsion in the direction opposite of rotation of the rotor 112 would be maximized, thus requiring more force to overcome.

Figure 6:
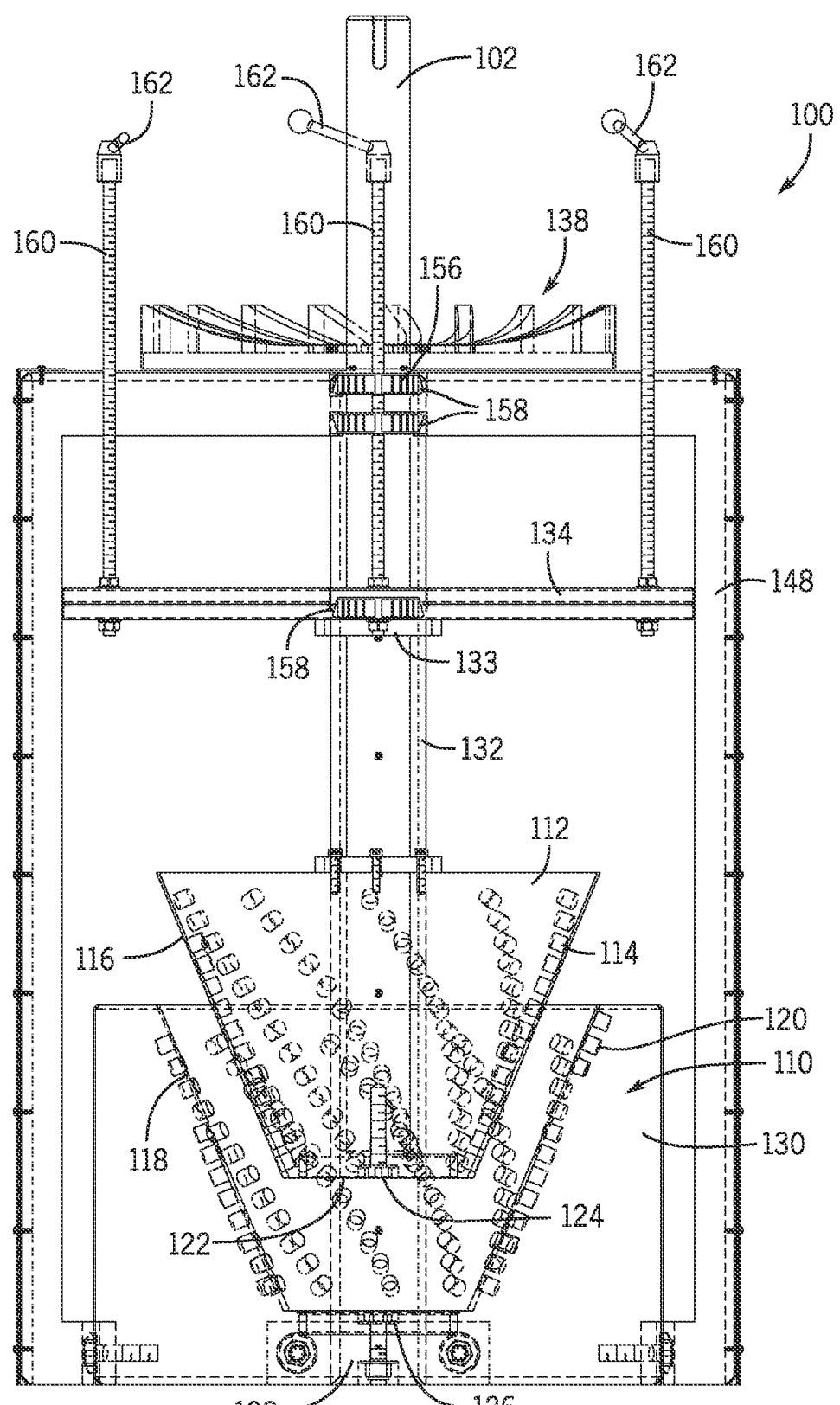
FIG. 6 is a sectional view of the compressed inverted magnetic energy source.

FIG. 6 depicts one example of the system 100 wherein the rotor magnets 114 and the stator magnets 120 are spaced at uneven intervals. By distributing the rotor magnets 114 and the stator magnets 120 irregularly, only a percentage of rotor magnets 114 and stator magnets 120 are in the misalignment which results in repulsion counter to the direction of rotation of the rotor 112. In other words, the magnetic repulsion is minimized, thus requiring a lower force to overcome.

As previously noted, the system 100 requires the rotor 112 to be compressed into an axial position relative to the stator 110. The same repulsive force between the rotor magnets 114 and the stator magnets 120 that drives the rotor 112 as described above, also repels the rotor 112 away from the stator 110 entirely. A compressive force must be applied to the rotor 112 and the stator 110 to overcome this repulsion and hold the rotor 112 in position relative to the stator 110. The compression plate 134, as previously described, includes a hole 136 through which the shaft 102 extends through the compression plate 134. A rotor flange 132 is secured to the outer surface 121 of the rotor 112 and extends away from the rotor 112 coaxially along the shaft 102. The end of the rotor flange 132 distal from the rotor 112 ends in an engagement surface 133. The compression plate 134 operatively engages the rotor flange 132 at the engagement surface 133.

Force applied to the compression plate 134, as will be described herein, is transferred to the rotor 112 by engagement of the compression plate 134 with the rotor flange 132. In an example, ball bearings 146 are positioned between the compression plate 134 and the rotor flange 132, to reduce friction between the compression plate 134 and the rotor flange 132. The ball bearings 146 may also simultaneously engage the shaft 102. A force is applied to the compression plate 134 which is transferred to the rotor 112 to move the rotor into an axial alignment relative to the stator 110. This force may be manually, mechanically, or electromechanically applied.

The ball bearings 146 enable the shaft to spin but at specific strength and design to keep the shaft straight and fixed into the compression plate 134. In examples, although not necessarily required, the shaft 102 extends through a hole 156 in the frame 148. Ball bearings 158 may further be used to reduce friction between the frame 148 and the shaft 102 and also to help keep the shaft 102 straight and rotating about the central axis. The compression plate 134 may be provided in two parts, for example, to come apart for assembly and placement of the ball bearings 146.

As shown in FIGS. 1 and 2, the system 100 may include a frame 148, which may also be a shell or housing, that is secured to the stator 110 and extends away from the stator 110. The compression plate 134 is mechanically connected to the frame 148. The frame 148 may include teeth 150 to which are engaged by an incremental engagement feature 152, which may exemplarily be a gear, pinion, or ratchet. The compressive force may be applied by a manual lever or wheel 154. FIG. 6 depicts an additional example of a system which may impart compression between the compression plate 134/rotor 112 and the frame 148/stator 110. As shown in FIG. 6, threaded screws 160 extend through the frame 148 to the compression plate 134. The threaded screws 160 may have handles 162 for manual control or adjustment. Rotation of the threaded screws 160 moves the compression plate 134 towards or away from the frame 148.

A person of ordinary skill in the art will recognize, from these disclosures, other solutions for applying the compressive force while remaining within the scope of the present disclosure. In other examples, the compressive force may be applied from an external motor (not depicted), which may operate any of the mechanical compression systems as shown herein, or others as would be recognized based upon the present disclosure. The external motor may exemplarily be the same motor which, in some embodiments, provides an initial rotation of the rotor 112 and the flywheel 138.

Control of the axial distance between rotor 112 and stator 110 upon compression can be used to control the output torque and/or speed of the shaft 102 rotated by the interaction between the rotor 112 and the stator 110. As previously discussed, the closer that the rotor 112 is positioned relative to the stator 110, the greater the intensity of the repulsive magnetic force between the rotor magnets 114 and the stator magnets 120 which is translated into a greater rotational force on the rotor 112 and the shaft 102.

The magnets in the system as described herein may be any of a variety of magnets, however, permanent magnets and/or rare earth magnets may present advantages over electromagnets as electromagnets will increase energy use of the system. In other examples, electromagnets may provide improved control of the magnetic fields used to rotate the rotor and the shaft. In an example, the magnet may include lode stone.

As previously noted, the disclosed system may require an external power source to initiate spinning of the rotor/shaft/flywheel. In still further examples, the same or additional electric motors may be used to control the compression of the rotor towards the stator and also provide the initial acceleration of the rotor/shaft/flywheel. In such applications, the system 100 may be an effective energy transfer system to convert the force from the compression and/or initial rotor/shaft/flywheel acceleration into rotational output, for example to drive a mechanical system or to generate electricity.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for the generation of rotational force, the system comprising:

a stator comprising an interior surface;

a plurality of stator magnets arranged in the interior surface, each stator magnet of the plurality of stator magnets having a first pole and a second pole, and each stator magnet of the plurality of stator magnets being arranged with the first pole pointing interior to the stator;

a rotor comprising an exterior surface;

a plurality of rotor magnets arranged in the exterior surface, each rotor magnet of the plurality of the rotor magnets having the first pole and the second pole, and each rotor magnet of the plurality of rotor magnets being arranged with the first pole pointing exterior to the rotor;
a shaft connected to the rotor; and
a compression plate mechanically connected to the rotor wherein a compressive force is applied to the compression plate;
wherein the compressive force is applied to the rotor to move the rotor through the compression plate to a position relative to the stator such that the plurality of stator magnets and the plurality of rotor magnets repulse to create a rotational force on the rotor.

2. The system of claim 1, wherein the stator magnets and the rotor magnets are further aligned tangentially to a circumference about a common axis of the rotor and the stator.

3. The system of claim 1, wherein the stator magnets are angled perpendicular to the stator surface and the rotor magnets are angled perpendicular to the rotor surface.

4. The system of claim 1, wherein the stator and rotor magnets are optionally angled tangentially to a circumference about a common axis of the rotor or angled such that the rotor magnets are perpendicular to the rotor surface and the stator magnets are perpendicular to the stator surface.

5. The system of claim 1, wherein the shaft extends through a hole in the compression plate.

6. The system of claim 5, further comprising:
a rotor flange that extends away from the rotor and extends about the shaft, the rotor flange is configured to engage the compression plate to transfer the compressive force from the compression plate to the rotor.

7. The system of claim 6, further comprising:
a plurality of ball bearings, disposed between the compression plate and the rotor flange, wherein the ball bearings reduce the friction between the compression plate and the rotor flange.

8. The system of claim 1, further comprising a flywheel secured to the shaft.

9. The system of claim 8, wherein the flywheel comprises weights secured to the flywheel.

10. The system of claim 8, wherein the flywheel has a mass distributed radially away from the shaft.

11. The system of claim 1, further comprising:
a gear reduction connected to the shaft; and
an electricity generator connected to the gear reduction.

12. The system of claim 11, further comprising:
a battery charger electrically connected to the electricity generator.

13. A system for the generation of rotational force, the system comprising:
a stator comprising an interior surface;
a plurality of stator magnets arranged in the interior surface, each stator magnet of the plurality of stator magnets having a first pole and a second pole, and each stator magnet of the plurality of stator magnets being arranged with the first pole pointing interior to the stator;
a rotor comprising an exterior surface;
a plurality of rotor magnets arranged in the exterior surface, each rotor magnet of the plurality of the rotor magnets having the first pole and the second pole, and each rotor magnet of the plurality of the rotor magnets being arranged with the first pole pointing exterior to the rotor;
a shaft connected to the rotor;
a tip magnet located in a tip of the rotor, the tip magnet comprising the first pole and the second pole; and
a vertex magnet located in a vertex of the stator, the vertex magnet comprising the first pole and the second pole, wherein the tip magnet and the vertex magnet are arranged axially with a common axis of the rotor and of the stator with the first pole of the tip magnet facing the first pole of the vertex magnet;
wherein a compressive force is applied to the rotor to move the rotor to a position relative to the stator such that the plurality of stator magnets and the plurality of rotor magnets repulse to create a rotational force on the rotor.

14. The system of claim 13, further comprising a compression plate mechanically connected to the rotor wherein the compressive force is applied to the compression plate, which applies the compressive force to the rotor in a direction along the common axis; and
wherein the first pole of the vertex magnet repulses the first pole of the tip magnet.

15. The system of claim 14, wherein repulsion of the tip magnet from the vertex magnet reduces friction between the rotor and compression plate.

16. A system for the generation of rotational force, the system comprising:
a stator comprising an interior surface;
a plurality of stator magnets integrated within the stator, each stator magnet of the plurality of stator magnets having a first pole and a second pole, and each stator magnet of the plurality of stator magnets being arranged with the first pole facing inward from the interior surface;
a rotor comprising an exterior surface;
a plurality of rotor magnets integrated within the rotor, each rotor magnet of the plurality of the rotor magnets having a first pole and a second pole, and each rotor magnet of the plurality of rotor magnets being arranged with the first pole facing outward from the exterior surface;
wherein the first pole of the stator magnets and the first pole of the rotor magnets are the same pole;
a shaft connected to the rotor;
a tip magnet located in a tip of the rotor, the tip magnet comprising the first pole and the second pole; and
a vertex magnet located in a vertex of the stator, the vertex magnet comprising the first pole and the second pole, wherein the tip magnet and the vertex magnet are arranged axially with a common axis of the rotor and of the stator with the first pole of the tip magnet facing the first pole of the vertex magnet;
wherein a compressive force between the stator and the rotor reduces a distance between the rotor and the stator such that the plurality of stator magnets and the plurality of rotor magnets repulse to create a rotational force on the rotor.

17. The system of claim 16 further comprising:
a compression plate mechanically connected to the rotor wherein the compressive force is applied to the compression plate, which applies the compressive force to the rotor.

18. The system of claim 17, wherein the compressive force is in a direction along the common axis, and wherein the first pole of the vertex magnet repulses the first pole of the tip magnet.

19. The system of claim 18, wherein repulsion of the tip magnet from the vertex magnet reduces friction between the rotor and compression plate.

* * * * *